April 16, 1963     P. ARBEIT     3,085,408
METHOD AND FURNACE FOR MAKING GLASS
Filed Oct. 3, 1957     3 Sheets-Sheet 2
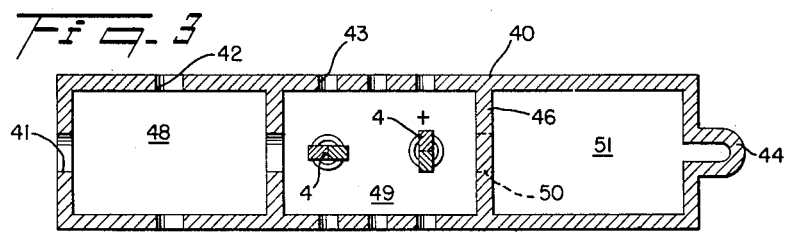
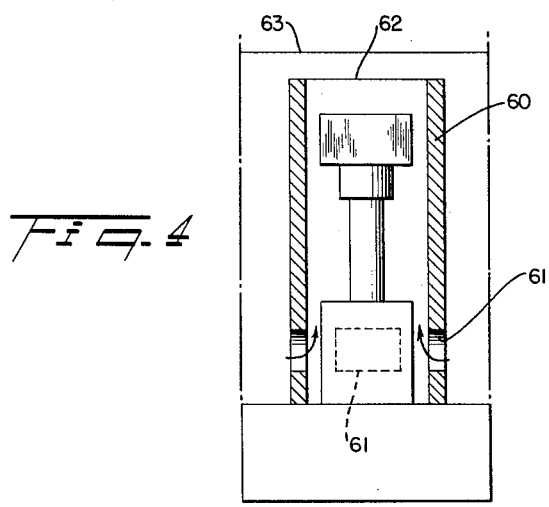
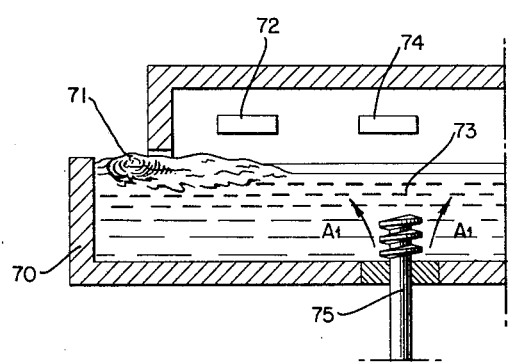
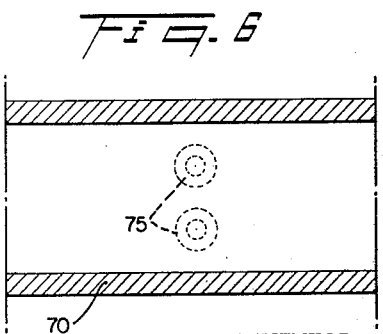
INVENTOR.
PIERRE ARBEIT
BY Bauer and Seymour
ATTORNEYS

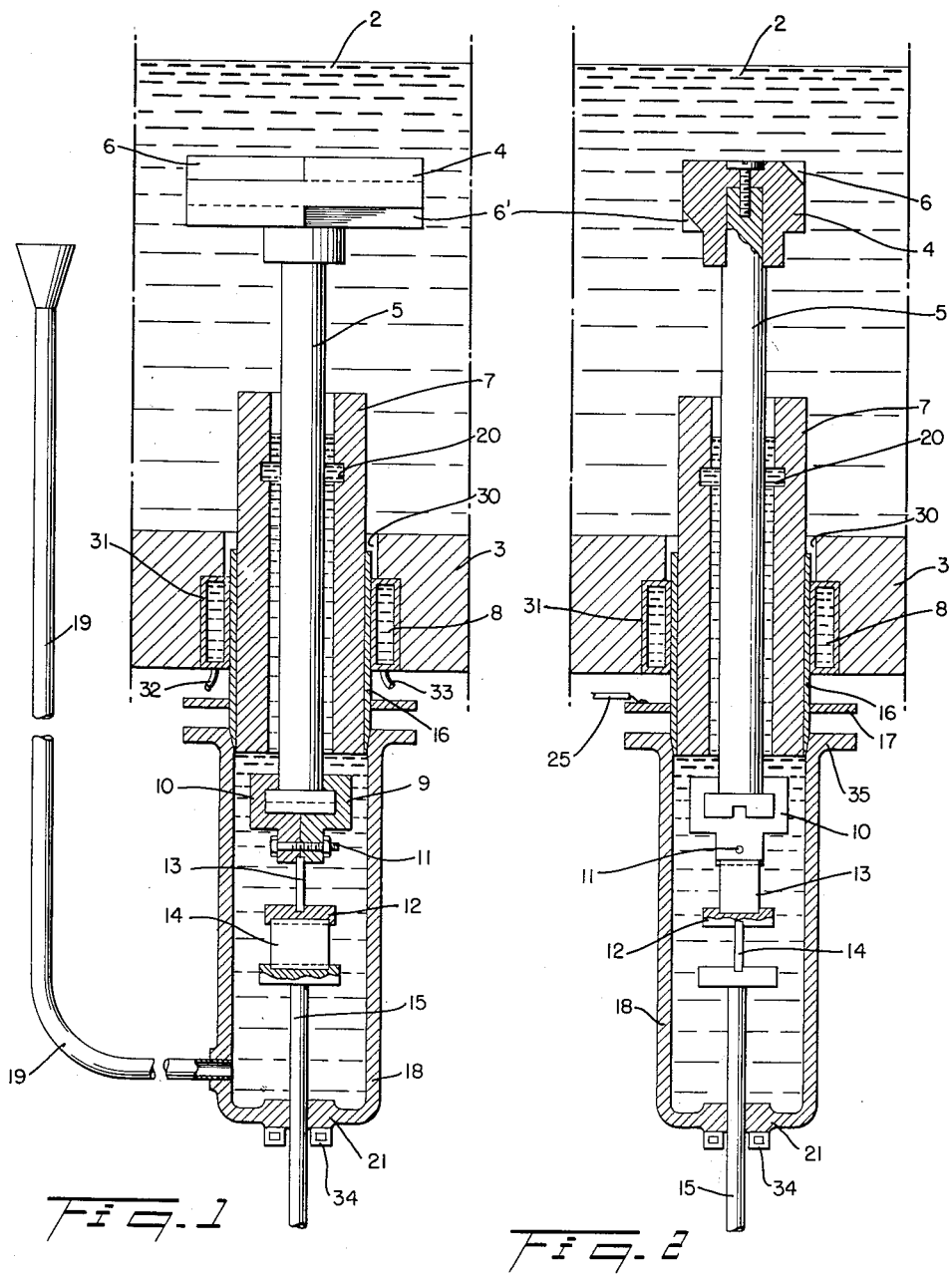

United States Patent Office 3,085,408
Patented Apr. 16, 1963

3,085,408
METHOD AND FURNACE FOR MAKING GLASS
Pierre Arbeit, Paris, France, assignor to Compagnie de
Saint-Gobain, Paris, France
Filed Oct. 3, 1957, Ser. No. 687,938
Claims priority, application France May 16, 1950
2 Claims. (Cl. 65—121)

This application is a continuation-in-part of application identified as Arbeit Serial No. 225,708, filed May 11, 1951, now abandoned.

The invention relates to glass furnaces of continuous flow type in which the raw materials are admitted at one end of a melting tank, from the other end of which the finished glass is withdrawn. There have been at different times and places, a lack of uniform terminology, and that lack of uniform terminology has found its way into the literature, and particularly into works for the laity such as dictionaries. We will, therefore, define the terms as they are to be used in this specification:

By melting or fusing we mean that period in the manufacture of glass during which the temperature of the raw materials is continually increased until they lose their solid form and diffuse into the molten or liquidus phase.

By fining we mean that step in the preparation of glass during which the liquidus produced by melting is increased in temperature and reduced in viscosity, and gases are released until, shortly after the maximum temperature of the glass-making operation has been reached, the bursting of bubbles on the surface of the glass ceases, although fine bubbles are still left in the liquidus. In most cases the maximum temperature attained by the glass, which is reached in fining as defined herein, is circa 1450° C.–1500° C. according to glass composition.

After fining, there is a period in the manufacture of glass during which the temperature is regularly lowered and the fine bubbles which were then dispersed in the liquidus are reabsorbed and go into solution. This we call "plaining."

By conditioning, we mean that period in the manufacture of the glass in which the liquidus is brought progressively down to that temperature which is satisfactory for use in forming machines. Conditioning includes the control of the temperature of the glass in the conditioning zone in the body of the furnace and also the temperature control which is employed in the forehearths and in the small feeders which deliver the glass to forming machinery.

The foregoing periods in the manufacture of glass are characterized by very different requirements of heat:

The period of fusion utilizes a very large part of the total quantity of heat which is necessary for the preparation of the glass, for instance, 50%.

Fining also requires a substantial quantity of total heat, for instance 30%.

The following periods of manufacture require also some quantity of heat in order to compensate for a too rapid cooling by thermal losses through the walls of the furnace.

The period of re-absorption of the little bubbles in the glass takes little heat, for example, 10%.

Conditioning takes variable quantities of heat, depending upon the final temperature desired in the glass during the forming operation, and may be considered to require from about 5% to 15% of the total heat.

The quantities of glass which are present in the body of a continuous glass furnace are very substantial, 250 tons or more being not unusual, and thus the very bulk of the glass being thus treated results in the introduction of problems and the invention of techniques for the solution of those problems. Whereas the weight of the glass in the furnace itself may be on the order of tens or hundreds of tons, the quantity of glass in a feeder is on the order of hundreds of pounds.

The glass depth in the tanks of such furnaces is frequently on the order of 3 feet. In flame-heated furnaces the flame is admitted above the glass and beneath the refractory dome and the glass is heated by radiation and convection from the flames and the hot refractory of the dome.

Between the glass at the top of the tank and that at the bottom there is frequently a difference of 150° C. in temperature or much more, in particular in the case of colored glass, and it thus follows, according to the prior art, that the glass at the surface and that at the bottom of the tank do not receive the same thermal treatmen and consequently differ in properties. The method of applying heat has tended to accentuate this difference rather than to equalize the temperature of the glass. Thus, the bottom of the furnace is cool and tends to cool the contiguous glass and keep it on the bottom while the heating means above the glass tends to keep that glass hottest which is on the top. The hotter the flame, the greater the differences in temperature between top and bottom.

Attempts have been made to improve the efficiency of continuous glass furnaces by compartmentation, the zones being more or less isolated from each other by separatory walls which more or less control currents generated by convection and maintain proper differences between the temperatures of adjacent zones.

Various efforts have been made to increase the efficiency of such furnaces by the use of electrical heating, usually by Joule effect, and such electrically boosted furnaces have proved to be highly successful. An example of such treatment is identified as Arbeit Patent 2,636,914 wherein electrodes located in the bottom of the furnace generate vertically ascending currents by imparting heat to the adjacent glass.

Numerous efforts have been made to homogenize by stirring effect the molten glass in the plaining and conditioning zones of the furnace, in order to keep the finished glass homogeneous when it arrives, in small quantity, in the feeder. Heat flow through refractory walls involve an excessive and uneven cooling rate so that the glass tends to cool unevenly and too rapidly, to stiffen and to form cords, and means have to be adopted to combat that condition. Patents such as Cannon, Jr. et al. 2,467,809, Stenhouse 1,927,101, Brosse 2,115,408 and Hanson 2,616,221 are exemplary of means and methods which have been developed for maintaining the homogeneity of glass at low temperature in feeders.

In the Arbeit patent a main object was to increase the thermal efficiency of the continuous glass furnace by thermoelectrical means, but the main objects of the other patents were otherwise.

A main object of the present invention is to increase the thermal efficiency of the continuous glass furnace by mechanical means.

It is a major object of this invention to reduce the number of calories required per kilo of fined glass delivered to the plaining and conditioning zones. The object may also be stated as to reduce the heat required for the production of fined glass.

Another object is to institute controlled mixing of the cooled bottom glass in the melting and fining zones and to generate streams of selected location, or direction, or velocity in the melting and fining zones.

Another object is to displace top glass from the surface and to replace it with cooler glass from the depths of the fining and melting zones at a rate related to mechanical power which is under the control of the operator, and is not dependent on convection currents.

Vitreous materials have in the molten state a high viscosity tending to oppose motions of the molten mass. Furnaces for preparing such materials, wherein the heat for melting is applied from above as by blowing flame upon the surface of the mass of material or by radiation from resistors placed above the mass, are usually capped by a vault which radiates heat down upon the mass. In such furnaces the free surface of the mass is easily heated but the heat does not penetrate well into the depths so that there is a steep temperature gradient between the surface and the bottom. The lower levels are cool, the cooler lower layers of the melt, being of higher viscosity and density, tend to remain at their own level and not to displace the hot surface layers. The invention may also be applied in furnaces having cold walls and differences in temperature in different places, which tend to set up convection currents, although the viscosity of the treated molten material opposes the rapid renewal of the different layers.

The general flow of such furnaces is toward the discharge end and the rate of flow is controlled by the rate of withdrawal of fined and conditioned glass. Downstream is thus the direction toward the place of discharge of the furnace. The invention is capable of setting up currents in any desired direction and inherently sets up currents which would not otherwise be generated and which flow in directions and with velocities unattainable by prior means.

This invention in one of its most important phases relates to flame-heated furnaces, used in making glass. The invention will be described in its application to the glass art wherein these problems are important, due to the special nature of the material treated, the temperature at which glass making proceeds, which may attain 1450° C. or more, and the weight and viscosity of molten glass.

The invention has as objects to initiate the flow of cold glass from the depths to the surface where it is directly exposed to flame and radiation. Another object is to improve the efficiency of flame furnaces. Another object is to provide at least one mechanical means penetrating into the molten bath through the sole of the furnace for initiating controlled glass current flow in a glass furnace. Other objects will be apparent as the description proceeds.

The objects of the present invention are accomplished, generally speaking, by a continuous flow process including the establishment of melting temperature in a melting zone containing unfined liquidus, fining temperature in a fining zone downstream thereof, and plaining temperature thereafter, that includes the operations of heating the upper part of said melting zone to a temperature adequate to melt raw materials, flowing liquidus from said melting zone to a fining zone, heating the upper part of the downstream zone to fining temperature and to a degree materially hotter than lower levels of the liquidus therein, impelling a stream of liquidus from a lower level of a said zone to the upper part thereof, while maintaining the temperature of the stream except for interchange with surrounding media, and flowing liquidus out of said zone to a succeeding zone.

In the preferred form of the invention, the impelling means is mechanical and is operated, at a depth where the glass is materially colder than at the surface, to propel such glass so that it reaches the highly heated upper levels while still relatively cold. The propelling means is activated and provides sufficient energy to force a stream of the cooler glass from below to the surface in direct proximity to the heat.

For high temperatures the transfer of heat from the source of heat to the glass occurs principally by radiation.

When the vertical current instituted by the impeller reaches the surface, it would spread out radially on the surface in all directions, until interrupted by some material obstacle, were it not that there is a current flowing from the melting end towards the feeder along the furnace. As a result, the velocity of the currents from the impeller, as they spread out on the surface, are affected by the main current in the tank itself; thus, speed downstream will be the main current speed in the tank plus the speed attained by the impeller current measured in a still tank. The current upstream will be equal to the difference between the velocity of the impelled current on the surface of still glass minus the velocity of the main current of the tank. The velocity of laterally directed currents will depend upon their angular direction.

Thus, there are established surface currents flowing in all directions away from the spot at which cold glass from the impeller reaches the surface. They have the valuable function of arresting the progress of unmelted materials along the tank and are particularly valuable in uncompartmented tanks.

In compartmented tanks, the surface currents progress until they approach a wall and are then turned downwardly into the glass, thus establishing regular, controlled systems of current.

As the impeller may be driven more or less quickly, the surface currents can be driven with greater or less velocity, and may be driven with so little velocity that the main currents in the tank may be sufficient to neutralize or overcome them so that there will be no upstream flow at the surface. The ability to control the current is within the discretion of the furnace man.

When the velocity of the radially directed currents is high, it is advisable to increase the heat, and a reduction in the velocity of the impelled currents contemplates that the quantity of heat admitted will be reduced.

In the preferred form of the invention the stream of impelled glass is not heated in its course toward the source of heat, except that there may be some interchange with hotter surrounding glass or with the wall of an encompassing tube, as it is desirable to have the glass attain proximity to the heating means in a cool state.

The transfer of heat by radiation between two layers having temperatures of $T_1$ and $T_2$ is proportional to $T_1^4$ and $T_2^4$. In using impellers according to the invention, which drive cooler glass from below to above, the temperature at $T_2$ is reduced and thus, if $T_1$ remains the same, the transfer of calories by radiation is materially increased. This principle has secured the success of the invention. Thus, a much larger quantity of heat is absorbed by the glass in these new furnaces than was previously possible and without changing the rate of fuel supply.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical view mainly in section through a portion of a glass furnace including a form of this invention;

FIG. 2 is a sectional view taken vertically through the apparatus of FIG. 1 in a plane normal to that of FIG. 1;

FIG. 3 is a plan view of a glass furnace having a compartmented melting zone constructed in accordance with this invention; and FIG. 4 is a sectional view, partly diagrammatical, showing an advanced development.

FIGS. 5 and 6 show diagrammatically, in corresponding vertical section and plan view, a flame heated furnace using the principle of the invention in the fining zone.

Figure 7:
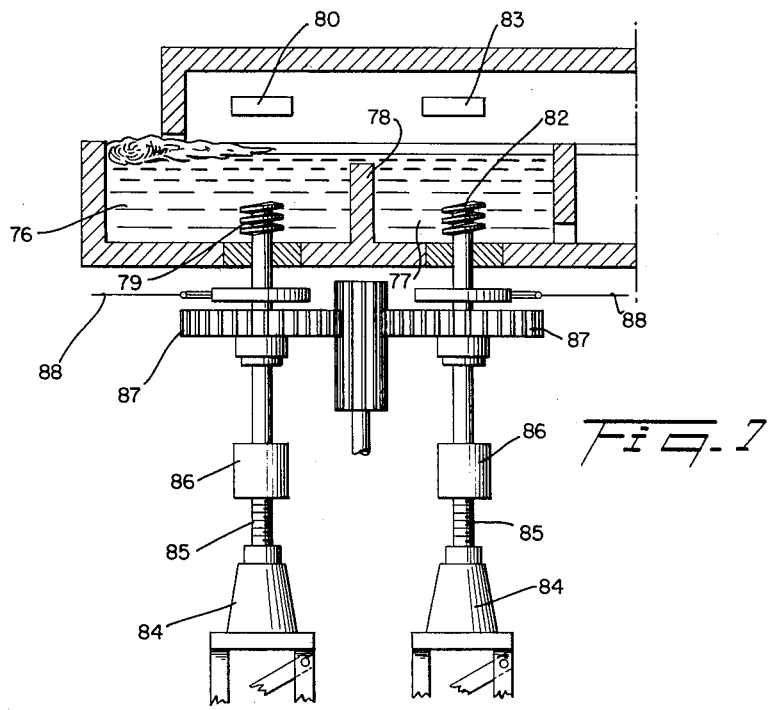
FIGS. 7 and 8 show diagrammatically, in corresponding vertical section and plan view, another type of furnace according to the invention.

In the form of the invention shown in FIG. 1, 1 indicates the glass in a furnace of continuous type that is heated from above by flame and 2 is the free surface of the glass. The bottom or sole 3 of the furnace is composed of refractory brick and is provided with an aperture 30 of circular section which is enlarged below at 31 and receives a hollow metal ring 8 that is provided with inlet 32 and outlet 33 means for cooling fluids such as water.

An impeller 4 of rectangular shape is supported in the glass bath by a shaft 5 which extends through opening 30. The impeller is beveled at 6 and 6', the bevel extending from the outer corner to the center of the side in each instance. When the shaft 5 is rotated counterclockwise, the bevelled edges 6 become leading edges and edges 6' following edges, producing upward vertical motion in the glass. When the shaft 5 is rotated clockwise the leading edges are 6' and the hot glass from the top is forced downward toward the bottom.

The shaft 5 is supported and sealed in a wholly unique manner. The lower end of the shaft is flanged and a split clamp 10 receives it and is held thereon by a bolt 11 which also holds the upper flexible metal web 13 of a flexible coupling the upper web of which is attached to a lower web 14 by means of an interposed plate 12 which is attached to both, thus being provided with flexibility in both directions as the webs 13 and 14 are normal to each other. A shaft 15 supports the entire structure for rotation by a driving means not shown.

A reservoir 18 encloses the coupling, being provided with a stuffing box 34 at the bottom which receives and seals the shaft 15. A flange 35 projects outward at the top and a sleeve 16 is internally received, at its outwardly bevelled lower end, in the upper part of the reservoir so as to constitute a continuation of the reservoir. This sleeve is received in the cooling ring 8 and is protected thereby against the temperature of the glass in the furnace. A tube 7 has a tight fit in the sleeve 16 and a loose fit about shaft 5. A filler tube 19 provides for filling reservoir 18 with molten tin, which is maintained in molten state by any satisfactory heating means, not shown, applied to reservoir 18. The tube 7 is provided with an internal enlargement 20, which serves to limit the upward travel of molten metal. A temperature of 220° C. is adequate.

The impeller may be composed of refractory material, and when glass is involved it is preferably amorphous carbon, graphite or metals such as molybdenum. These materials are good conductors and make it possible to use the impeller and its associated parts as heating means. For instance, current can be brought through lead 25 from whence it passes through sleeve 7, which is also graphite or a refractory metal, through the molten tin in the tube and to the shaft and impeller.

The molten tin serves as a liquid lubricant for the shaft. In one use of the invention the impeller, of which there may be one or more, is rotated to raise the colder lower layers to the surface; in another use the impellers force the hot surface materials down into the cold lower layers; in another use one impeller works upwardly and another downwardly. In all cases the hot surface layers are replaced by glass from the cooler lower layers which are thus directly exposed to the flame and in turn raised to the desired temperature, the speed of manufacture is increased and the homogeneity of the glass is improved.

The thermodynamic advantages of this invention are achieved in the fining and/or melting zones of the furnace. It is valuable to locate such an impeller in a part of the furnace where an ascending or descending convection current has been otherwise established, so as to accelerate the current, to retard or nullify it, or to reverse it.

It has been discovered that an improvement is also obtained when the furnace is compartmented and the impellers are used in the compartments; for instance, by isolating the fining area by walls extending upward from the bottom of the furnace and employing the impellers in this fining chamber. This construction is illustrated in FIG. 3 wherein 40 is the glass furnace having a port 41 for the admission of the lump of raw materials, ports 42, 43 for the admission of flame, and forehearth 44 for the discharge of finished glass. A fining zone is set off by walls 45—46 extending upwardly from the sole of the furnace and from wall to wall, a shallow and narrow channel 47 connecting the melting zone 48 with the fining zone 49 at the surface of the glass, and a submerged throat 50 connecting the fining zone with working zone 51 at the bottom of the furnace. Plaining occurs in the working zone. Impellers 4 are located in the fining zone and serve to subject all the glass in it to repeated exposure to the fining temperature of the flame. The currents initiated by the impellers are the more rapid as the surface of the compartment is reduced in size.

The impeller means generates a stream of cool, lower level glass that moves up through the surrounding hotter glass, and is forced to the surface where it is exposed to heating by convection from the flame and by radiation from the dome. As the temperature of the cold lower layers may be more than 150° C. lower than the temperature of the upper hot layers, the efficiency of heat transfer is very greatly increased and better heating results without increasing the heat supplied.

The height of the impellers can be regulated by raising or lowering the shaft 15 by pushing it through the stuffing box. In this way their effect can be employed on levels of different depth and different temperature and viscosity.

The impeller can be surrounded by a tube 60, as in FIG. 4, which may be of graphite or other refractory material, which is provided with inlet ports 61 at a selected level, in this case near the sole, and discharges at the rim near the surface of the glass 63. Conversely the hot glass can be taken from the surface by reversing the impeller and made to discharge in any selected direction by providing a submerged orifice pointed in that direction. This has the advantage that the efficiency of the ascending streams is not diminished by the deflection of side streams into the surrounding glass. This principle of impelling glass through a tube from a lower to an upper level by non-thermal means is believed to be broadly new.

The invention contemplates improvements in furnaces for the melting of materials of high viscosity in the molten condition by which vertical currents are started non-thermally so as to be directed to a region of high temperature such as an area touched by flame. The impellers may be of the new type shown or of helical or other satisfactory type.

The impellers may be vertically, freely and flexibly suspended and lubricated with liquid metal; they may be vertically adjusted; they may be electrified to act as submerged electrodes; they may be enclosed in conduits such as vertical tubes. The drive for the impellers may be enclosed in melted metal, or may pass through a graphite bearing in the sole of the furnace, and the sole of the furnace is thus sealed. A metal denser than the glass or other contents of the furnace may be employed as a seal.

As glass is found in any one pool of many furnaces in different stages of heat treatment, in different stages of melting or refining, it has sometimes been the loose custom to call the whole operation "melting" or "fining," or to assert that the fining pool is a part of the melting zone because unfined glass is in it, or that the melting pool is a part of the fining zone because some completely melted liquidus is present, or to assert that plaining, conditioning or feeding are part of the melting or fining steps because some imperfect glass may be found in them, but such arguments do not obscure the fact that the several zones have distinct functions. In general, the highest temperature attained in the glass of such furnaces is about 1450° C.–1500° C. although this will vary with glasses easy to fuse and hard to fuse, but that highest temperature occurs before plaining, its occurrence is a part of the fining operation, and its location is a part of the fining zone. The word "zone" refers to the region of the whole furnace and not merely to the glass in the zone.

By way of example and in order to show the advantageous technical effect of the present invention, in a trial made with rotating electrodes, provided with screwtype impellers, which were located in the fining cell, heated by Joule effect, of a continuous furnace, it was possible to reduce by 20 to 25 percent the input of electrical energy in the fining zone while obtaining the same production of glass of the same and even better quality, and without any other modifications in the heating of the melting zone.

There is thus provided a furnace and process in which a melting zone, as above defined, is established, usually near the upstream end of the tank and usually containing crude, unfined, liquidus and unmelted raw materials floating therein. Downstream of the melting zone is a fining zone into which liquidus from the melting zone flows and in which the highest temperature of the glass is reached, usually about 1450° C.–1500° C. From the fining zone the glass, now finished as to expulsion of gases and melting of materials, flows to a plaining zone and a conditioning zone from which it is shaped for use, for instance by drawing or rolling into sheets or by flow into forehearths (feeders).

In the melting and fining zones, impellers of the types included herein act to move the glass from a lower to an upper level. When the impeller acts in the melting zone, there is a continuous renewal of the molten glass against the bottom of the lump which facilitates the melting of the solid materials. In some cases hot glass may be drawn by the impeller from a hotter zone and driven against the lump floating in the melting zone, much increasing the efficiency of melting. In other cases a part of the melting zone upper layers may be hotter than lower layers, and the impelling of the lower layers into the hot layers aids the melting of highly refractory particles in the liquidus. Marked increase in thermal and thermodynamic efficiency results.

In cases where the furnace tends to establish convection currents of desirable nature, the impellers may be placed so as to improve the circulation, but where a convection current is undesirable it can be eliminated or reversed by an appropriately placed and driven impeller.

In the fining zone of most practical furnaces a sufficient depth of glass exists by necessity which results in a material difference between the temperatures of the upper levels of glass therein and the levels therebelow. The heat from dome and heat source are more largely absorbed by the upper layers than by the lower. By impelling the colder glass from the lower levels into the more intensely heated upper levels, a marked increase in the thermal efficiency of fining is secured, and also a marked improvement in homogeneity. A part of this increase in efficiency arises from the arrival of the colder glass, still cold, in the region of great heat. This distinguishes the method from a prior method in which electrodes applied heat to glass in the cooler lower levels and thus heated it until it received a convectional upward impulse.

The stream of glass which is thus impelled upward must go somewhere, and it tends to spread out on the surface and to establish a flow away from the place at which it emerges from below, but as the sides of the tank limit its flow in lateral directions, the main flow is lengthwise of the tank, both upstream and downstream. The upstream current generated by an impeller in the fining zone proceeds against the downstream face of the lump, unless it is stopped by a compartmentation wall, melts it, and keeps solid particles from flowing into the fining zone. The downstream current carries fined glass toward the plaining zone.

When an impeller is mounted in the melting zone under the lump, the currents generated tend to assist melting by abrasive and disruptive action, and by continually renewing the contact of hot glass with the cold bottom of the lump.

By mounting impellers in different locations, and by driving them in opposite directions, one may establish a circulatory system unrelated to the convection currents set up by the tank itself, or which assist or oppose such currents. Thus, it is often useful to locate an impeller beneath the hot spot naturally formed by the tank during its operation.

In FIG. 5, a tank 70 is shown in which the raw materials 71 are fused under the action of flames issued from a burner 72. The glass obtained is refined in zone 73 under the action of the flames issued from burner 74.

An impeller 75 located in the fining zone 73 rotates in such a direction as to move the molten glass upwardly from the lower part of the tank to the upper part of the bath. The relatively cold glass of the lower layer is thus brought mechanically by the impeller to the upper part of the bath where it is heated by flames issued from burner 74, as shown by arrows $A_1$.

FIG. 6 is a horizontal section of the part of the tank where the impellers 75 are located. The figure shows two impellers. They can act as electrodes, each one being connected to a corresponding pole of an electrical supply in such a manner that, in addition to their mechanical action, they produce also a thermal action. Due to the heating effect of the electrical current in the glass surrounding the impellers-electrodes, the glass thus heated tends to ascend, this effect being added to the mechanical action of the impeller. It is thus possible to control the upward velocity of the glass current by means of the rotating speed of the propeller and by means of its heating effect.

In case of impellers acting mechanically only, their use has permitted in certain furnaces, either to increase their refining capacity and consequently their production of at least about 25%, or when such an increase of the production was not desired, to reduce by 15% the quantity of calories necessary for the fining operation.

In one case of a flame-heated furnace in which a complementary supply of electrical energy was brought in the fining zone by ordinary electrodes, it has been possible, by using impellers to reduce the electrical energy of about 50% for a same production and fining quality.

Figure 8:
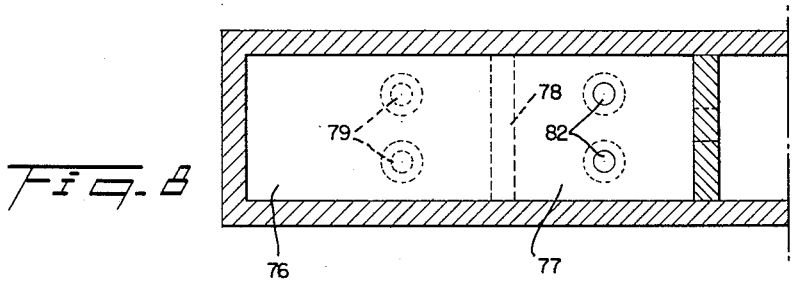

FIGS. 7 and 8 show a furnace in which the melting zone 76 and the fining zone 77 are separated from each other by a barrier 78 leaving a passage for the glass at the surface of the bath.

The melting zone 76 heated by a flame burner 80, is provided with impellers 79 which may act also, when desired, as electrodes.

In the fining zone, the impellers 82 insure the renewal of the glass in the upper layers of the bath which are submitted to the heating action of the flames issued from the burner 83.

The effect of the impellers of the melting zone as well as those of the fining zone can be controlled by having them acting at any desired level within the glass bath, their position being determined by jack-like devices 84, the screw shaft 85 of which supports a piece 86 provided with a rotating bearing for the rotation axis of the impeller. The rotation of each impeller 82 may be obtained by means of gears 87. The impeller may be connectable at 88 to a supply of electrical current.

Figure 9:
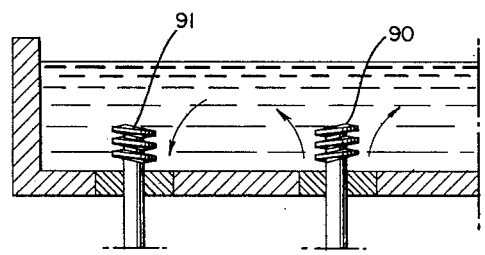
FIG. 9 is a vertical section of a further form of furnace according to the invention.

FIG. 9 shows the use of impellers according to the invention to control and in particular to accelerate convection currents set up in the glass bath under the action of the heating means.

An impeller 90 capable of producing ascending glass currents is located in a zone of the bath where convection currents occur in a substantially vertical direction from the bottom towards the upper part of the bath. Such an impeller enables to increase the velocity of the glass currents directed upwardly in this zone of the tank.

If it is desired it is still possible to increase the velocity of the convection currents by placing, in the zone where descending currents occur, propellers 91 rotating in a convenient direction for accelerating the downward movement of the glass.

It is possible, as in the previous examples, to use the impellers 90 as electrodes in order to increase their mechanical effect by thermal action.

As many apparently widely different embodiments of the present invention may be made without departing from the spirit and scope thereof, it is to be understood that the invention is not limited to the specific embodiments.

What is claimed is:

1. A glass furnace having a body adapted to contain a great bulk of unfined glass gathered in a melting and a fining zone, and have a plaining zone thereafter, heating means acting upon said glass to advance its stage of completion and having its effect concentrated in the upper layers thereof, impulsion means comprising a tube submerged in the glass in a said melting and fining zone, in position to direct a current of glass into association with the location of the concentrated heat from said heating means, and means associated with said tube to establish a swifter current of glass from a lower level into the concentrated heat from said heating means than is provided by convection currents.

2. The method of making glass by a generally continuous, horizontal-flow process including the establishment of different temperatures in successive zones, that comprises forming a zone of liquidus of material depth containing unmelted raw materials, directing heat of melting quantity and degree upon the surface of the glass in said zone, forming from such liquidus a second zone of material depth, heating the surface of the glass in said second zone to fining temperature thereby establishing material difference in temperature between the upper and lower levels thereof, withdrawing cooler liquidus from the lower level of a said zone out of contact with surrounding liquidus, and impelling it to the surface of a said zone, thereby exposing it directly to heating while it is still cool, the impelling of the cooler liquidus to the surface being at a rate which materially improves the thermal efficiency of the process.

References Cited in the file of this patent

UNITED STATES PATENTS

| | | |
|---|---|---|
| 1,598,307 | Pike | Aug. 31, 1926 |
| 1,852,218 | Peiler | Apr. 5, 1932 |
| 1,927,101 | Stenhouse | Sept. 19, 1933 |
| 2,022,223 | Taylor | Nov. 26, 1935 |
| 2,041,486 | Richalet | May 19, 1936 |
| 2,203,269 | Mulholland | June 4, 1940 |
| 2,238,800 | Mueller | Apr. 15, 1941 |
| 2,331,052 | Shadduck | Oct. 5, 1943 |
| 2,467,809 | Cannon et al. | Apr. 19, 1949 |
| 2,523,030 | Labino | Sept. 19, 1950 |
| 2,593,197 | Rough | Apr. 15, 1952 |
| 2,616,221 | Hanson | Nov. 4, 1952 |
| 2,636,913 | Lambert | Apr. 28, 1953 |
| 2,707,621 | Peiler | May 3, 1955 |
| 2,716,023 | Cleveland | Aug. 23, 1955 |
| 2,762,167 | De Voe | Sept. 11, 1956 |

FOREIGN PATENTS

| | | |
|---|---|---|
| 711,976 | France | July 8, 1931 |
| 621,282 | Great Britain | Apr. 6, 1949 |
| 134,393 | Australia | Sept. 26, 1949 |

OTHER REFERENCES

Handbook of Glass Manufacture, published by Ogden Publishing Co., N.Y., 1953, pages 242, 243, 252 to 256, 269, 270, 281–289 and 463.

Modern Glass Practice, Scholes, published by Industrial Publication, Inc., Chicago, Ill., 1947, pages 116, 117 and 120.